(12) United States Patent
Alderson et al.

(10) Patent No.: US 6,900,884 B2
(45) Date of Patent: May 31, 2005

(54) AUTOMATIC MEASUREMENT OF THE MODULATION TRANSFER FUNCTION OF AN OPTICAL SYSTEM

(75) Inventors: Timothy Alderson, Winter Spring, FL (US); Gene D. Tener, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 532 days.

(21) Appl. No.: 09/969,787

(22) Filed: Oct. 4, 2001

(65) Prior Publication Data

US 2003/0067595 A1 Apr. 10, 2003

(51) Int. Cl.$^7$ ............................................. G01M 11/00
(52) U.S. Cl. .................................... 356/124.5; 356/124
(58) Field of Search ............................. 356/124.5, 124, 356/71, 237.4, 237.5, 239.3, 243.4, 243.5

(56) References Cited

U.S. PATENT DOCUMENTS

| | | | |
|---|---|---|---|
| 3,743,427 A | | 7/1973 | Weiser |
| 3,912,396 A | | 10/1975 | Hartmann |
| 4,241,996 A | | 12/1980 | Weiser |
| 4,582,427 A | * | 4/1986 | Hutchin .................... 256/124.5 |
| 4,586,817 A | | 5/1986 | Ehemann, Jr. |
| 5,168,454 A | | 12/1992 | LaPlante et al. |
| 5,453,781 A | | 9/1995 | Stein |
| 5,509,556 A | | 4/1996 | Balz et al. |
| 5,600,432 A | * | 2/1997 | Lengyel et al. .......... 356/124.5 |
| 5,621,520 A | | 4/1997 | Hoffman |
| 5,629,766 A | | 5/1997 | Kaplan |
| 5,724,158 A | | 3/1998 | Koike |
| 5,748,230 A | | 5/1998 | Orlando et al. |
| 5,818,572 A | | 10/1998 | Pappas et al. |

\* cited by examiner

Primary Examiner—Gregory J. Toatley, Jr.
Assistant Examiner—Roy M. Punnoose
(74) Attorney, Agent, or Firm—Burns, Doane, Swecker Mathis, L.L.P.

(57) ABSTRACT

A system and method are described for automatically determining the modulation transfer function (MTF) of an optical system. In accordance with exemplary embodiments of the present invention, optical information is collected from the optical system by imaging a bar target having at least one associated frequency to provide a bar target image for a first focus setting of the optical system. A first MTF of the optical system is determined for the at least one associated frequency at the first focus setting from the bar target image. The steps of collecting and determining are repeated by automatically selecting at least a second focus setting of the optical system to determine at least a second MTF for the at least one associated frequency. An MTF for the at least one associated frequency of the optical system is determined by interpolating the first and at least second MTFs. According to exemplary embodiments, a bar target with alignment holes is used for automatically determining the orientation of the bar target. In an alternate exemplary embodiment, an open-hole DC target is used to calculate the DC response of the optical system.

29 Claims, 8 Drawing Sheets

AUTOMATIC MEASUREMENT OF THE MODULATION TRANSFER FUNCTION OF AN OPTICAL SYSTEM

BACKGROUND

1. Field of the Invention

The present invention relates generally to optical measuring equipment. More particularly, the present invention relates to a system and method for automatically measuring the modulation transfer function of an optical system.

2. Background Information

An electro-optical imaging sensor is a device that converts radiant energy of a particular wavelength or range of wavelengths into an electrical signal. The capability of the electro-optical sensor to resolve the details of an object is referred to as its "resolution." A useful measure of the resolution of the electro-optical sensor is provided by a modulation transfer function ("MTF").

The MTF of an electro-optical sensor is a measure of the ability of the sensor to resolve fine detail of a scene. In other words, the MTF expresses the ability of an optical or electronic device to transfer signals faithfully as a function of the spatial or temporal frequency of the signal. MTF is analogous to the sine wave frequency response of an RC filter. However, a sensor MTF can include the effects of the optics, detector, electronics, display, and even the human eye for end-to-end performance predictions.

The MTF is measured by characterizing output amplitude response as a function of input sinusoidal spatial frequency. In other words, it is the ratio of the percentage modulation of a sinusoidal signal leaving to that entering the device over the range of frequencies of interest. A detailed discussion of the MTF and of conventional methods and apparatus for determining it can be found in U.S. Pat. No. 3,743,427, the disclosure of which is hereby incorporated by reference in its entirety.

In the past, knife edge and spot scan techniques have been used to measure the MTF. However, there are a number of drawbacks associated with such conventional methods and arrangements for evaluating the MTF of a device or system. The most common technique for analyzing the MTF of an optical system is the knife edge technique, in which the Fast Fourier Transform of the differentiated edge response is taken. The knife edge technique is described in, for example, U.S. Pat. No. 5,629,766, the disclosure of which is hereby incorporated by reference in its entirety. However, the results of this technique can be easily misinterpreted due to inadequate removal of offset, edge roughness noise and focus. Furthermore, the knife edge technique is very difficult to implement in a staring array due to the limited number of samples across the edge. In addition, the determination of the DC component can produce huge errors if the sensor has significant scattering or large area crosstalk.

Similarly, the spot scan technique is difficult to implement due to the data collection effort required to examine multiple samples of a single pixel. With the spot scan technique, two-dimensional phasing and alignment can present problems, while scattering and crosstalk can become a huge source of error. In addition, both techniques suffer from the difficulty of performing repeatable measurements with certainty. In sum, both of the techniques are time-consuming and cumbersome to implement.

Another method for determining the MTF of an optical system is by computing the contrast transfer function ("CTF") from a square wave (bar) target. The CTF is the comparison of the input and output intensities of a square wave (bar) target. The CTF, also referred to as the square wave response ("SWR"), is determined by imaging a bar target onto a sensor and determining a normalized curve of peak-to-peak output as a function of spatial frequency. The MTF at desired frequencies can then be calculated as a linear combination of the CTF (SWR) measurements. In the past, a minimum resolvable target ("MRT") was used for calculating the CTF. Each MRT target is comprised, however, of only one frequency. Therefore, multiple MRT targets would be required if the analysis of multiple frequencies is desired. In addition, conventional MRT targets do not provide an easy means for aligning the targets to the proper orientation for computing the CTF and, consequently, the MTF of the optical system.

Accordingly, it would be desirable to provide systems and methods for measuring the MTF of an optical system which are more accurate, faster, and repeatable, but which do not require the time and complexity of conventional systems and methods.

SUMMARY OF THE INVENTION

A system and method are described for automatically determining the modulation transfer function (MTF) of an optical system. In accordance with exemplary embodiments of the present invention, optical information is collected from the optical system by imaging a bar target having at least one associated frequency to provide a bar target image for a first focus setting of the optical system. A first MTF of the optical system is determined for the at least one associated frequency at the first focus setting from the bar target image. The steps of collecting and determining are repeated by automatically selecting at least a second focus setting of the optical system to determine at least a second MTF for the at least one associated frequency. An MTF for the at least one associated frequency of the optical system is determined by interpolating the first and at least second MTFs.

According to exemplary embodiments, a bar target with alignment holes is used for automatically determining the orientation of the bar target. In an alternate exemplary embodiment, an open-hole DC target is used to calculate the DC response of the optical system.

Exemplary embodiments of the present invention offer several advantages over previous MTF measurement techniques. For example, the effects of noise are mitigated or eliminated, because many frames of data can be taken to ensure minimal noise influence. In addition, the roughness of any one edge is of little concern where many different edges are provided on the target for each frequency. Furthermore, there is no need to remove an offset from the differentiated edge response, because exemplary embodiments of the present invention provide a direct measurement of the modulation on a square wave target. Finally, focus is not an issue since digital frames are collected at several focus positions and a best focus measure is interpolated for more accurate results.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
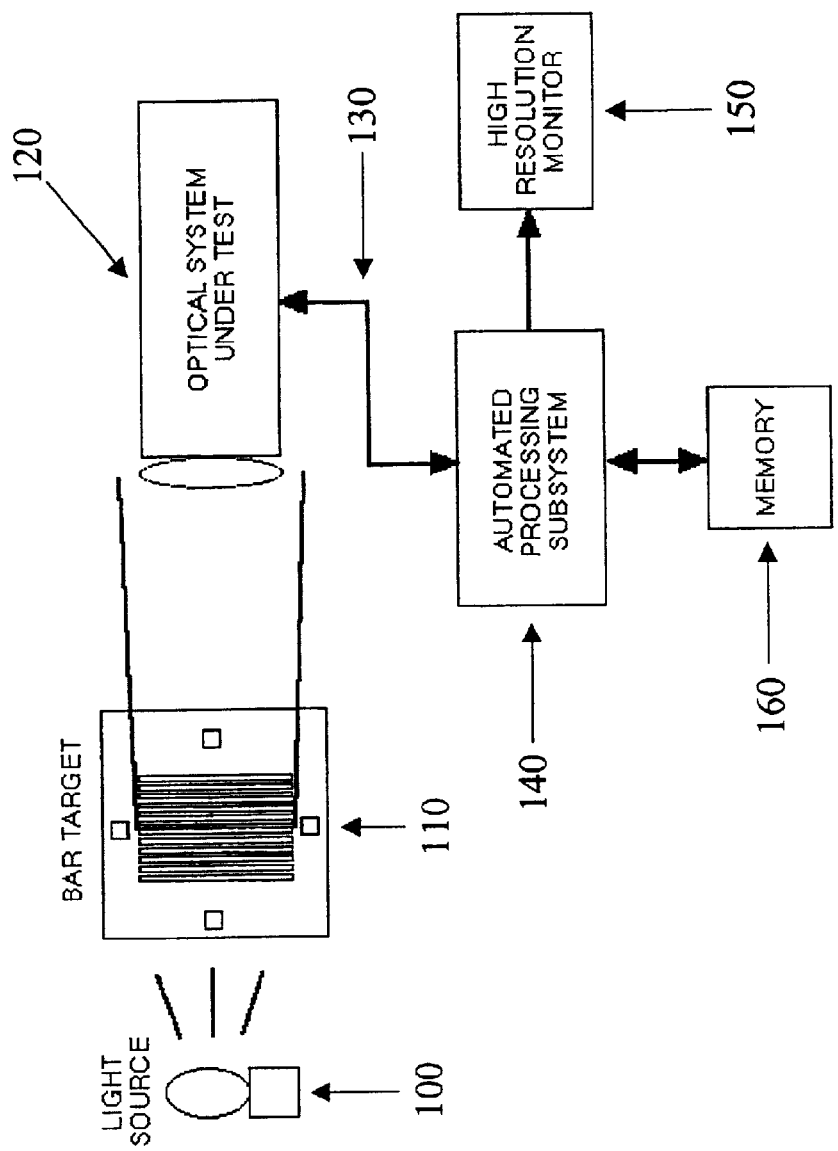
FIG. 1 is a block diagram of an optical system with an automated processor subsystem and a bar target in accordance with an exemplary embodiment of the present invention.

FIG. 1 is a block diagram of an optical system 120. Connected to optical system 120 via a connection 130 is an automated image processing subsystem 140. In an exemplary embodiment, image processing subsystem 140 can be completely, or nearly completely, automated. Optical system 120 obtains an image of a bar target 110 illuminated from behind by a source 100. Image processing subsystem 140 processes the image data obtained via optical system 120. The bar target image can be used by image processing subsystem 140 to automatically measure the modulation transfer function ("MTF") of optical system 120. Image processing subsystem 140 can include an associated memory 160 for storing image data, system software, operating code, and so forth. Image processing subsystem 140 can also include a high resolution monitor 150 for the display of various image information.

Figure 2A:
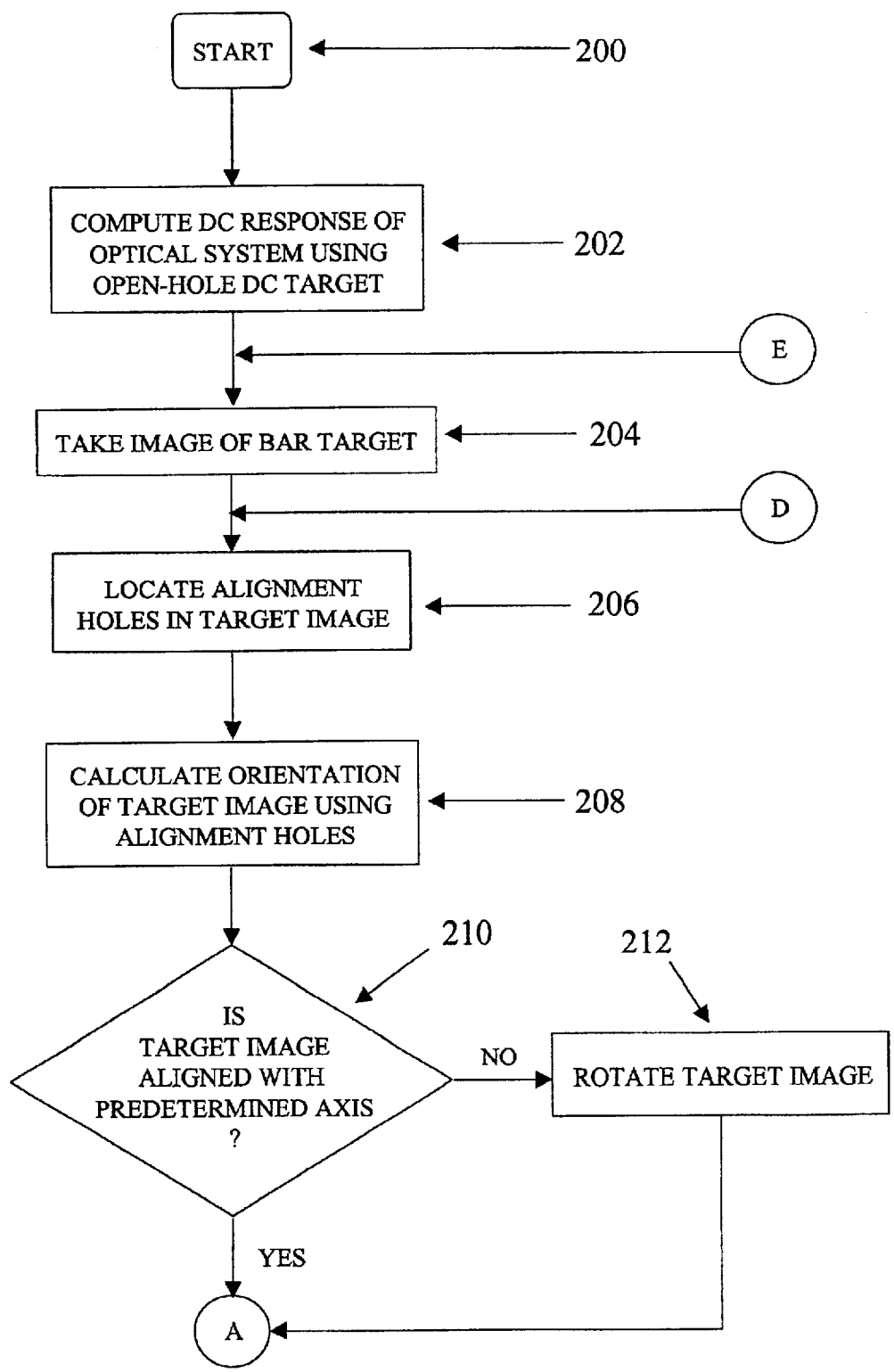
FIGS. 2A–2D are each a portion of a flowchart illustrating the steps carried out by the automated processor subsystem in accordance with an exemplary embodiment of the present invention.
Figure 2B:
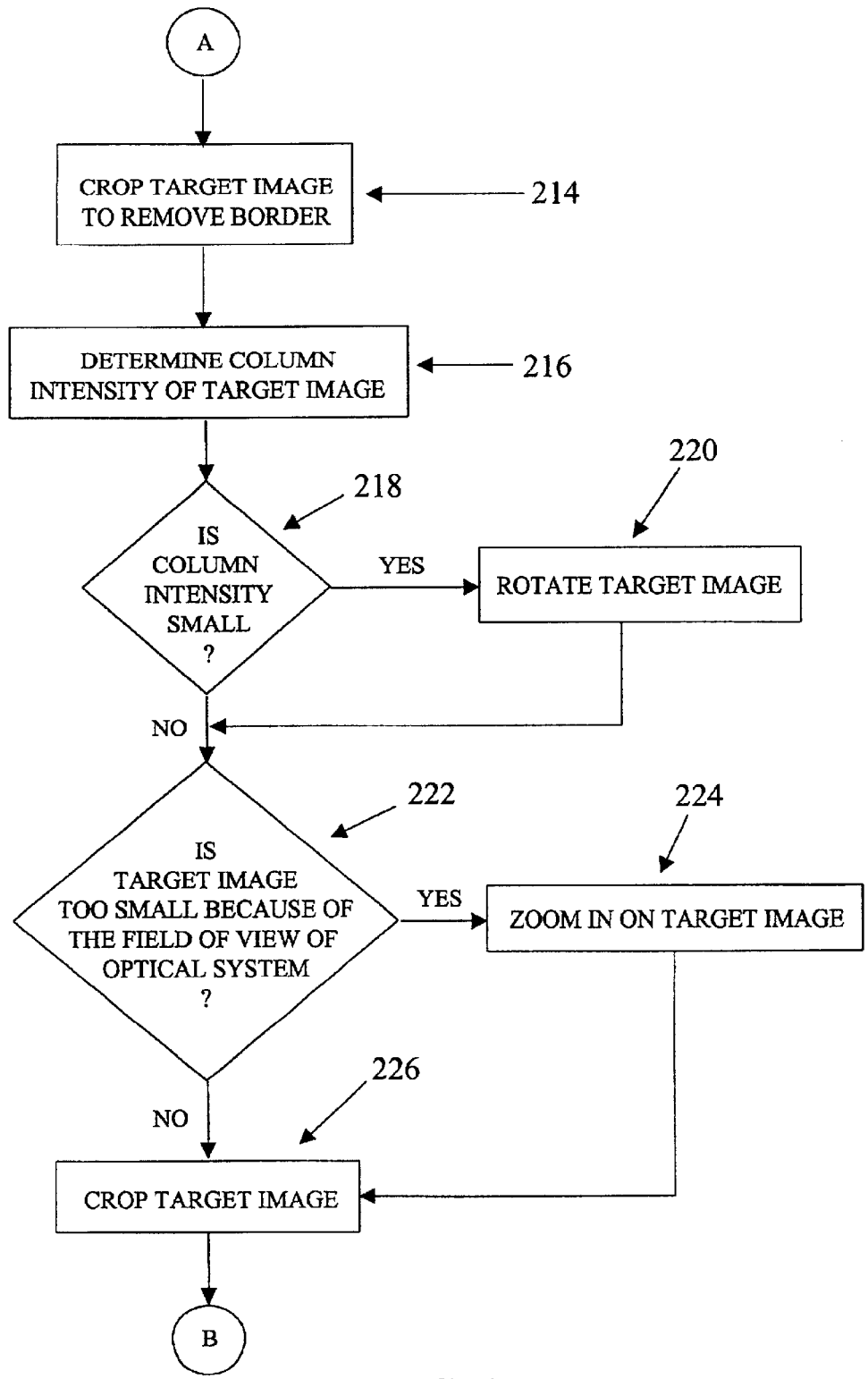

FIGS. 2A–2D illustrate an exemplary method for automatically performing MTF measurements. Referring to FIG. 2A, the first step in the method is to collect optical information from optical system 120 by imaging bar target 110 having at least one associated frequency to provide a bar target image for a first focus setting of optical system 120. Thus, in step 204, a digital image can be taken of bar target 110 at the first focus position of optical system 120. According to an exemplary embodiment of the present invention, the measurement of the MTF of optical system 120 can be performed automatically using digitized images of bar target 110. To acquire digital images of the necessary targets, for example, a digital frame grabber can used by either optical system 120 or image processing subsystem 140 to collect all of the optical information needed to perform the MTF measurements. However, any system which collects optical information can be used. According to exemplary embodiments, the bar target image obtained by optical system 120 can be a digital image. However, the bar target image obtained by optical system 120 can be an analog image. If an analog image is obtained, the image is digitized for processing by image processing subsystem 140. The bar target image can stored in memory 160 and/or in internal memory in image processing subsystem 140.

Figure 4:
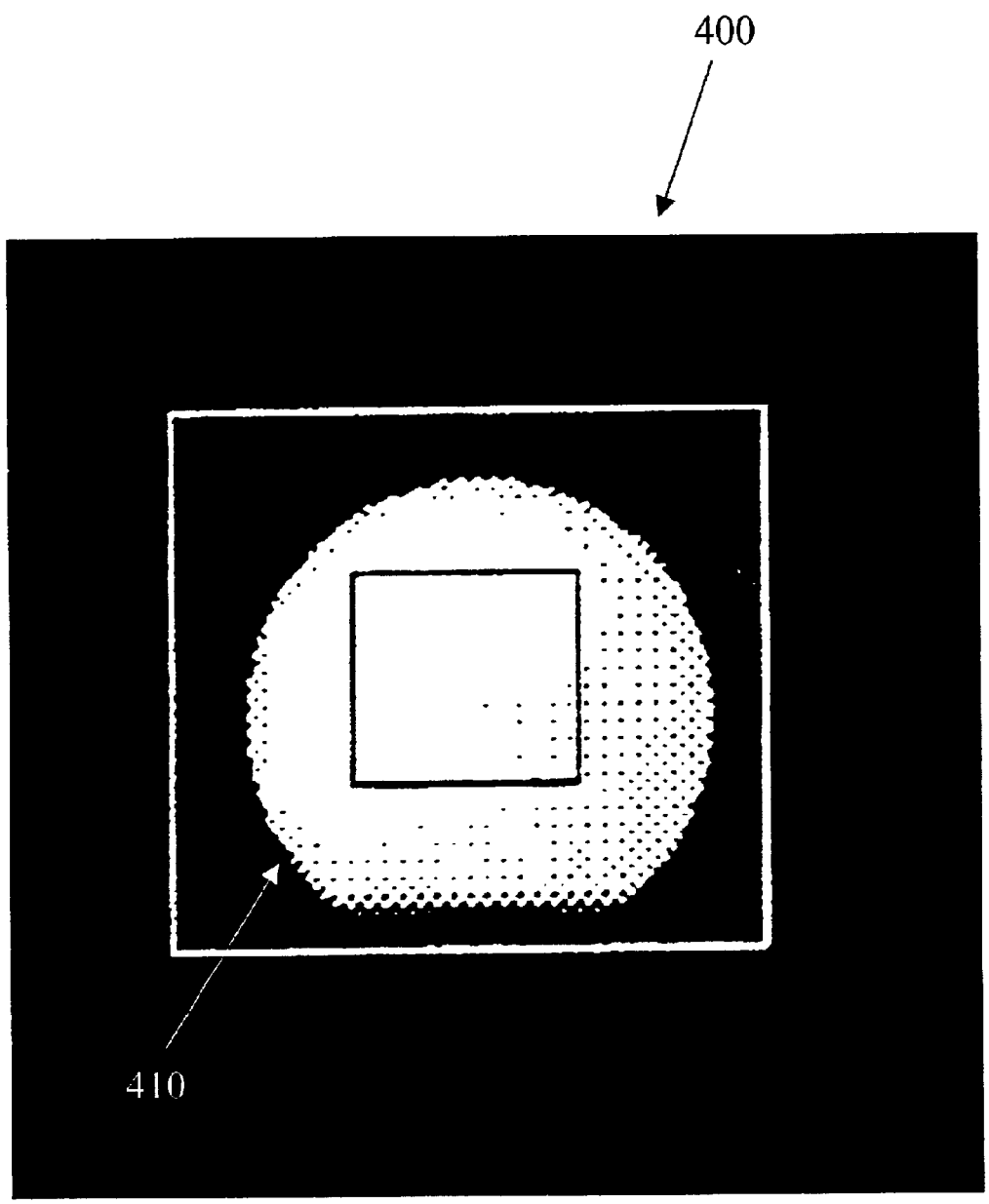
FIG. 4 is an open-hole DC target used for evaluating the MTF of the optical system in accordance with an exemplary embodiment of the present invention.

Prior to imaging bar target 110, image processing subsystem 140 can calculate the DC response of optical system 120 in step 202. In an exemplary embodiment, a separate target can be used in calculating the DC response of the optical system. As seen in FIG. 4, a DC target 400 can be comprised of a large open-hole section 410. The use of a large open-hole section to calculate the DC response reduces the effects of scattering and crosstalk. To calculate the DC response, a digital image can be taken of DC target 400. The central open (hot) region can be first found by examining the row and column averages to determine the location of the hot blackbody in the image. Once the open region of the target is found, the average value can be calculated and compared to the average value outside open-hole section 410 to provide the DC response.

As described in more detail hereafter, once the bar target image at the first focus position is taken, an exemplary embodiment of the present invention then determines a first MTF of optical system 120 for the at least one associated frequency at the first focus setting from the bar target image. Once determined, the steps of collecting optical information and determining the first MTF are repeated by automatically selecting at least a second focus setting of optical system 120 to determine at least a second MTF for the at least one associated frequency of the bar target image at the new focus position(s). After the MTF for each associated frequency at each focus setting is determined, an MTF for the at least one associated frequency of optical system 120 is determined by interpolating the first and at least second MTFs.

To determine the MTF of optical system 120, in step 206 a plurality of alignment holes are located in the bar target image. The alignment holes can be located around bar target 110 so that the bar target image can be automatically rotated to the proper orientation. Because the use of alignment holes allows the bar target image to be automatically oriented according to exemplary embodiments of the present invention, the orientation of bar target 110 in the field of view of optical system 120 is irrelevant. Once the alignment holes are located in the bar target image, the orientation of the bar target image can be calculated in step 208 using the plurality of alignment holes.

To perform the MTF measurement, the columns of the bar target image can be substantially aligned with a predetermined axis. Thus, the bar target image should be rotated to substantially align the bar target image with a predetermined axis when the bar target image is not oriented with the predetermined axis. For example, the columns of the bar target can be aligned with either the horizontal or vertical axis, so that the columns of the bar target image are either parallel to the vertical axis or parallel to the horizontal axis. However, any predetermined axis orientation may be used.

Once the orientation of the bar target image has been calculated in step 208, a determination can be made in step 210 as to whether the columns of the bar target image are aligned with the predetermined axis. If no such alignment exists, the bar target image can be digitally rotated in step 212 to align it with the predetermined axis to minimize distortions in the image. To rotate the bar target image, any image processing technique for rotating a digital image can be used, such as cubic interpolation or spline interpolation. In step 214 of FIG. 2B, the bar target image can be cropped to remove the border that surrounds the columns of the bar target image so that only the columns remain.

Once the bar target image is cropped and rotated along the predetermined axis, the bar target image may require, for example, approximately ninety degree rotation to ensure that modulation is measured down columns. In other words, the columns of the bar target image should be substantially parallel with, for example, a vertical axis. To determine whether rotation is necessary, the column intensity of the bar target image can be calculated in step 216. The column intensity is a measure of the relative spatial frequencies of the individual columns.

In step 218, if the calculated column intensity is determined to be small (e.g., at or near zero) and not to be following either an increasing or decreasing trend, then the bar target image is oriented row-wise (e.g., the columns are parallel with the horizontal axis). In such a case, in step 220 the bar target image can be rotated approximately ninety degrees so that the bar target image is substantially oriented column-wise (e.g., the columns are parallel with, for example, the vertical axis). Thus, the bar target image can be rotated when the column intensity is small so that the columns of the bar target image are substantially parallel with a vertical axis. If the bar target image is not oriented column-wise, then the measured modulation will be small for all frequencies and will not follow either an increasing or decreasing trend. When determining column intensity, the gaps between target frequencies can be used to determine the frequency breakpoints by searching for dips in the image intensity.

In step 222, a determination can be made as to whether the bar target image is too small due to the field of view of optical system 120. In step 224, the bar target image can be zoomed in on when the bar target image is too small because of the field of view of optical system 120. The bar target image can be zoomed in on to reconstruct and recover some of the modulation that can be lost due to non-optimum phasing of the bar target image with respect to the sampling lattice. To zoom in on the bar target image, any image processing technique for zooming in on a digital image can be used, such as cubic interpolation or spline interpolation. If the bar target image comprises the entire field of view of optical system 120, then the zooming of step 224 need not be performed.

Whether or not the zooming is performed, in step 226 an outer portion of the bar target image can be cropped again. To crop the image, an outer portion of the perimeter of the bar target image is removed to eliminate edge effects. In an exemplary embodiment, the outer five percent of the bar target image can be cropped. However, the removal of any small percentage of the outer portion of the bar target image will suffice, so long as the removal eliminates edge effects.

Figure 2C:
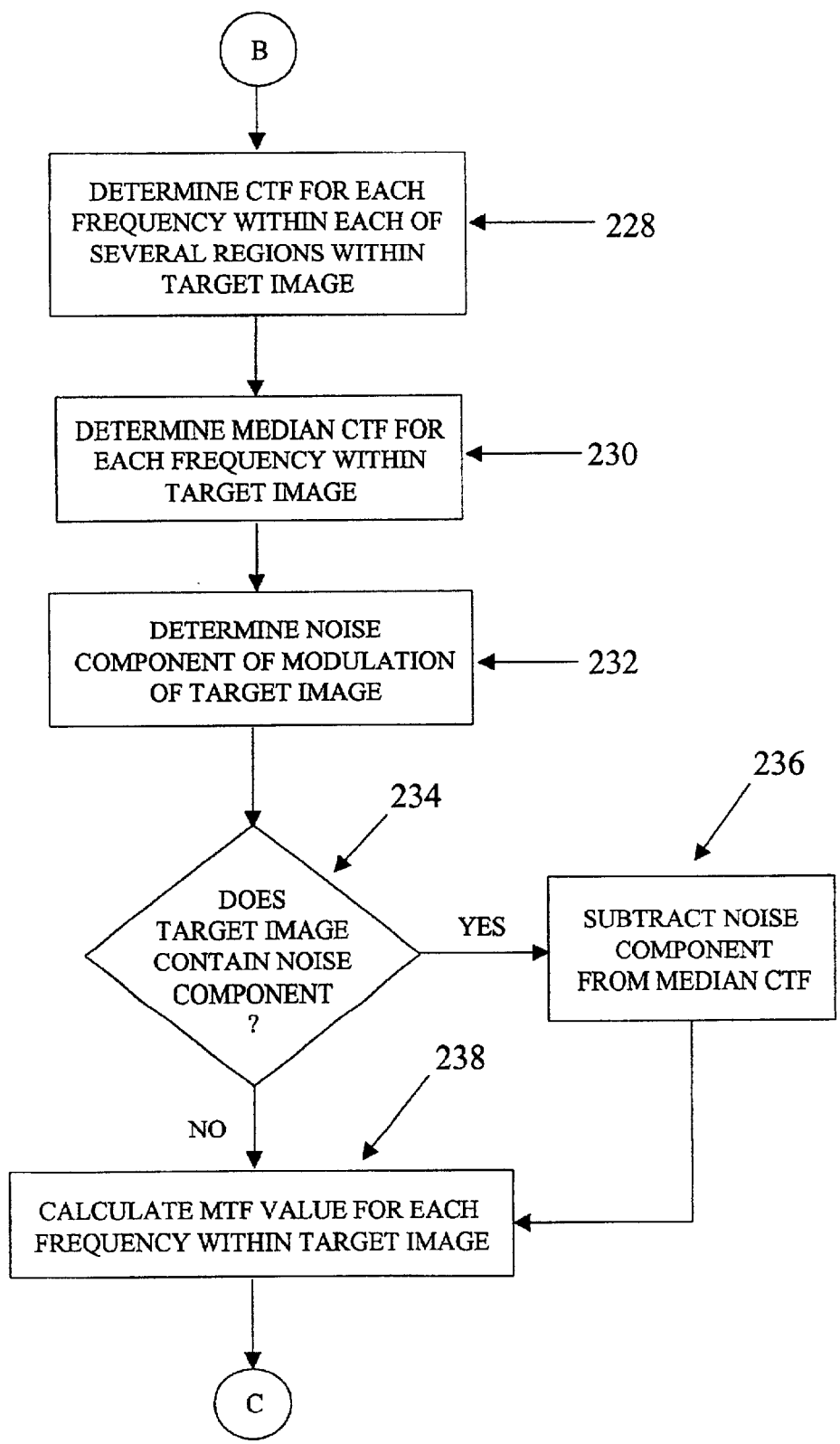
Figure 2D:
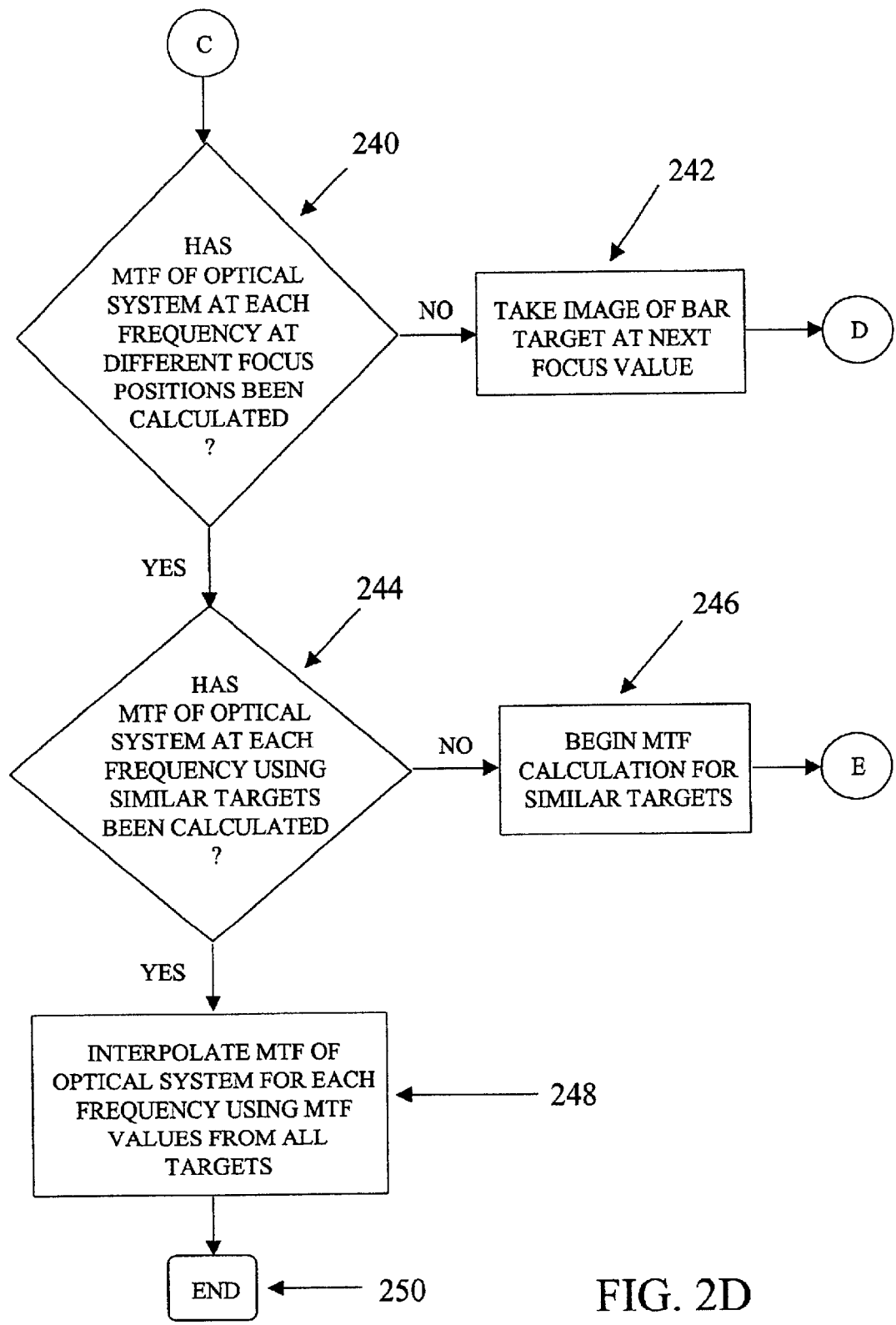

In step 228 of FIG. 2C, the bar target image can be segregated into a number of regions. In an exemplary embodiment, the bar target image can be divided into at least three regions. These regions can be substantially parallel to the horizontal axis (e.g., perpendicular to the columns of the bar target image) and each region should contain all frequencies of the bar target image. The contrast transfer function ("CTF") for each of the at least one associated frequency within each of the plurality of regions within the bar target image can be determined. Thus, in each region, the CTF (i.e., the modulation amplitude) of each frequency can be measured. By taking measurements of each frequency in each of several regions, each frequency will have several CTFs (i.e., modulation amplitudes) calculated for it. This is done to minimize shading effects, since shading could show up as modulation and adversely affect the CTF measurements. Additionally, if there are dead cells (i.e., detector elements that do not properly respond) in any region, the existence of these dead cells will also adversely affect the CTF measurement. In step 230, a median CTF can be determined from the CTF for each of the at least one associated frequency from the plurality of regions within the bar target image. Thus, by measuring the CTF for each frequency in each of several regions, a median CTF for each frequency in the bar target image can be determined. This can be accomplished by, for example, discarding the minimum and maximum CTF measurements for each frequency.

It should be noted that the accuracy of the modulation measurements performed in step 228 can also be improved by optionally removing any aliasing effects from each region before measurement. Aliasing effects within a region can cause drop-offs in the CTF measurements. Removing aliasing effects is optional and can be performed when, for example, greater improvements in measurement accuracy are desired.

Once the median CTF for each frequency in the bar target image is calculated, in step 232 the noise component of modulation of the bar target image at frequencies above a Nyquist limit of the optical system can be determined. The increase in modulation due to noise can also be removed to improve measurement accuracy. The noise measure can be determined by examining several frequencies well above the Nyquist limit of the optical system. The actual frequencies examined are dependent upon the optical system's performance characteristics. If a noise component is determined to exist in the bar target image in step 234, then in step 236 the noise component can be removed from the median CTF. The noise component should be subtracted off in quadrature from the calculated median CTF values for each frequency. Removing the effects of noise is optional and can be performed when, for example, additional improvements in measurement accuracy are desired.

In step 238, the MTF at each of the at least one associated frequency can be calculated using the median CTF measurement and a predetermined modulation measurement function. For example, the MTF values, one at each bar target image frequency, can be computed using the median CTF values and the following equation:

$$MTF(f_x) = \frac{\pi}{4} * \left[ CTF(f_x) + \frac{CTF(3*f_x)}{3} - \frac{CTF(5*f_x)}{5} + \frac{CTF(7*f_x)}{7} - \frac{CTF(11*f_x)}{11} \right] \quad (1)$$

In Equation (1), π is the constant 3.14159 etc., and CTF( ) represents the median contrast transfer function values calculated for each spatial frequency, $f_x$, in the bar target image (where the spatial frequencies of interest, $f_x$, should range, for example, from near DC to approximately one and a half times the Nyquist frequency of optical system 120). The method for automatically performing MTF measurements then continues in FIG. 2D.

At this stage of the procedure, the MTF values for each frequency contained in the bar target image have been calculated for the initial focus position of optical system 120. However, in step 240, a determination can be made as to whether the MTF values for each frequency contained in the bar target image have been calculated for other focus positions of optical system 120. If not, then in step 242 the collecting and determining steps can be repeated to determine the MTF at the first and at least second focus positions at the at least one associated frequency for a plurality of bar target images. Thus, another image of bar target 110 can be taken at the next focus value of optical system 120 (e.g., a focus value near the initial focus setting).

Once the new bar target image is taken at the new focus setting, the present procedure can begin again at step 204 in FIG. 2A to calculate the MTF values for each frequency in the new bar target image. In an exemplary embodiment, five focus settings of optical system 120 can be automatically selected: the initial focus setting taken near to what is estimated to be the ideal focus position of optical system 120; two focus settings taken at values below the initial focus position; and two focus settings taken at values above the initial focus position. The five different focus positions should be chosen such that they are equally separated over the range of focus values of optical system 120. However, any number of focus positions distributed in any manner can be used, so long as at least one focus position is at or near the observer's estimation of the best or ideal focus position of optical system 120.

In an exemplary embodiment, the following data can be collected to perform the MTF calculations: 32 frames of flooded blackbody data at room temperature; 32 frames of flooded blackbody data at a temperature just below saturation of the optical system 120; 16 frames of data of the DC target with a blackbody located behind it; 16 frames of data of bar target 110 in a horizontal orientation at focus position one; 16 frames of data of bar target 110 in a vertical orientation at focus position one; 16 frames of data of bar target 110 in a horizontal orientation at focus position two; 16 frames of data of bar target 110 in a vertical orientation at focus position two; 16 frames of data of bar target 110 in a horizontal orientation at focus position three; 16 frames of data of bar target 110 in a vertical orientation at focus position three; 16 frames of data of bar target 110 in a horizontal orientation at focus position four; 16 frames of data of bar target 110 in a vertical orientation at focus position four; 16 frames of data of bar target 110 in a horizontal orientation at focus position five; and 16 frames of data of bar target 110 in a vertical orientation at focus position five.

If the MTF of optical system 120 has been calculated for each frequency at different focus positions for bar target 110, then in step 244 a determination can be made as to whether the MTF of optical system 120 has been calculated for each frequency for other targets having similar focus values and identical orientations. If not, then in step 246 the calculation of the MTF of optical system 120 using similar targets can be performed for the new bar target starting at step 204.

Once the MTF values for multiple targets, at multiple frequencies, and at multiple focus values are calculated, in step 248 the MTF for each of the at least one associated frequency can be determined by interpolating the MTF at the first and at least second focus positions for the plurality of bar target images. Thus, the measured data for each frequency across all focus settings and across all bar target images can be interpolated to determine the MTF of the optical system 120 for each frequency. In an exemplary embodiment, a spline curve can be applied to the data to determine the best possible focus value of the MTF curve for each frequency of bar target 110. The maximum value of the spline curve will be the value of the MTF of optical system 120 for that frequency. However, those of ordinary skill in the art will recognize that any method for analyzing data sets to determine a maximum value within the data set can be used in step 248 in place of interpolation.

Prior to performing the MTF measurement technique described above, a two-point gain and level correction can be optionally performed on optical system 120 if greater accuracy of the MTF measurement results is desired. The gain and level correction normalizes the imagery (i.e., pixels) of optical system 120, since not all pixels in optical system 120 are the same. Gain and level correction can be used to, for example, remove noise components from the bar target image by calibrating each pixel. The noise components to be removed by calibrating each pixel are, for example, caused by variations in the gain and level from one detector element to the next. These gain and level variations are passed to the corresponding pixel values during acquisition of the bar target image. Calibration can be accomplished, for example, by applying a hot reference and a cold reference to each detector element and by adjusting the gain coefficient and the level coefficient for each pixel, if necessary, such that each pixel reflects the same value in response to the hot reference and in response to the cold reference. The process of calibrating each pixel value in response to a hot reference and a cold reference is described, for example, in commonly-assigned U.S. patent application Ser. No. 09/463,410, the disclosure of which is hereby incorporated by reference.

The results of the gain and level correction can be applied to both the DC target and bar target 110 to obtain the most uniform and noise-free results possible. Although gain and level correction can be performed in an exemplary embodiment, any correction technique that ensures that no shading or other errors interfere with the proper measurement of optical system 120 can be used.

In addition to gain and level correction, dead cell replacement can also be optionally performed on optical system 120 prior to performing the measurement technique to additionally improve the quality of the measurement accuracy. Dead cell replacement can be used to maintain a list of "dead" cells (i.e., detector elements that do not properly respond), and to replace the pixel value corresponding to each "dead" cell with a best approximation value. The best approximation value can be derived, for example, by averaging the values of the pixels which border the pixel corresponding to a "dead" cell. Only neighboring pixels that correspond to properly functioning detector elements are used for deriving a best approximation value.

Dead cell replacement can determine which detector elements are "dead" by applying any number of well known criteria. For example, the thermal response of each detector element can be compared to an expected response. If the actual response is far greater or far less than expected, the corresponding detector element is probably not functioning properly. Another criterion that is often used to establish whether a detector element is not properly functioning is whether the digital response of the detector element is steady or whether it appears to flicker. A flickering or jittery response probably indicates that the corresponding detector element is not properly functioning. Yet another criterion is to compare the actual response of a given detector element to the mean value taken from the response of all of the detector elements. A response that is substantially different from the mean response probably indicates that the corresponding detector element is not functioning properly. Also, if the dynamic range of a given detector element is limited, this probably indicates that the detector element is not functioning properly. One skilled in the art will understand that this list of criteria is not exclusive, and that other criteria can similarly be used to identify "dead" detector elements. The procedure for replacing "dead" cells is described, for example, in the above-referenced U.S. patent application Ser. No. 09/463,410.

As shown in the block diagram of FIG. 1, source 100 illuminates bar target 110 from behind. Source 100, commonly referred to as an "integrating sphere," produces a uniform distribution of light. The light produced by source 100 can be, for example, in the infrared or visible spectrum. Optical system 120 can be placed in front of bar target 110. According to an exemplary embodiment, optical system 120 can be any electro-optical imaging sensor. However, those skilled in the art will appreciate that optical system 120 is not limited to electro-optical imaging sensors. For example, optical system 120 could be a charge coupled device ("CCD") camera or any other imaging device.

As noted earlier, the bar target image can be transmitted to image processing subsystem 140 over connection 130. Connection 130 provides a mechanism for interfacing image processing subsystem 140 to optical system 120. According to an exemplary embodiment, connection 130 can be an electrical cable providing an RS-232 connection between the components. However, those skilled in the art will appreciate that connection 130 is not limited to such an embodiment. For example, connection 130 can include mechanisms ranging from a simple wire connection to a more complex fiber optic connection, with each capable of using different protocols for transferring electrical information. In other words, connection 130 encompasses any means for providing a conduit through which electronic image information can be passed between two electronic devices.

Image processing subsystem 140 can use a central processing unit (CPU) for executing the steps of a computer program as illustrated in FIGS. 2A–2D. The CPU of image processing subsystem 140 can be any known processor, such as, for example, a microprocessor or any general processor. The CPU can also be, for example, a microprocessor-based microcomputer, although it can be any computer suitable for efficient execution of the functions described herein. The CPU can control the functioning of and the flow of data between image processing subsystem 140 and either the optical system 120 or components such as high resolution monitor 150. High resolution monitor 150 can be a computer monitor or any other video display device for displaying graphical and textual information to a user.

Additionally, the CPU can control memory 160 and can handle the storage of image information. Memory 160 can be any computer memory or any other form of electronic storage media that is located either internally or externally to image processing subsystem 140. Memory 160 can store, for example, the steps of a computer program as illustrated in FIGS. 2A–2D. As will be appreciated based on the foregoing description, image processing subsystem 140 can be programmed using conventional techniques known to those having ordinary skill in the art of computer programming to carry out the steps of the MTF evaluation functions as illustrated in FIGS. 2A–2D described herein. The actual source code or object code for carrying out the steps of a computer program as illustrated in FIGS. 2A–2D can be stored in memory 160 and/or in internal memory in image processing subsystem 140.

For example, memory 160 can store steps of a computer program to determine a first modulation transfer function of the optical system (e.g., optical system 120) for the at least one associated frequency at the first focus setting from the bar target image. Image processing subsystem 140 can collect optical information from the optical system by imaging a bar target having at least one associated frequency to provide a bar target image for a first focus setting of the optical system. Any system which collects optical information can be used. Memory 160 can also store steps of a computer program to repeat the steps used to collect and determine by automatically selecting at least a second focus setting of the optical system to determine at least a second modulation transfer function for the at least one associated frequency, and to determine a modulation transfer function for the at least one associated frequency of the optical system by interpolating the first and at least second modulation transfer functions.

Memory 160 can store steps of a computer program to calculate a DC response of the optical system. According to exemplary embodiments, the step of the computer program to calculate the DC response can use an open-hole DC target. Memory 160 can store steps of a computer program to locate a plurality of alignment holes in the bar target image, and to calculate an orientation of the bar target image using the plurality of alignment holes. Memory 160 can also store steps of a computer program to rotate the bar target image to substantially align the bar target image with a predetermined axis when the bar target image is not oriented with the predetermined axis. Memory 160 can store the steps of a computer program to determine a column intensity of the bar target image and to rotate the bar target image so that columns of the bar target image are substantially parallel with a vertical axis, when the column intensity is small.

Memory 160 can store steps of a computer program to determine a contrast transfer function for each of the at least one associated frequency within each of a plurality of regions within the bar target image. Memory 160 can also store steps of a computer program to determine a median contrast transfer function from the contrast transfer function for each of the at least one associated frequency from the plurality of regions within the bar target image. Memory 160 can store steps of a computer program to calculate the modulation transfer function at each of the at least one associated frequency using the median contrast transfer function measurement and a predetermined modulation measurement function. According to exemplary embodiments, the predetermined modulation measurement function can be Equation (1).

Memory 160 can store steps of a computer program to repeat the steps used to collect and determine to determine the modulation transfer function at the first and at least second focus positions at the at least one associated frequency for a plurality of bar target images. Memory 160 can store steps of a computer program to determine the modulation transfer function for each of the at least one associated frequency by interpolating the modulation transfer function at the first and at least second focus positions for the plurality of bar target images.

Figure 3:
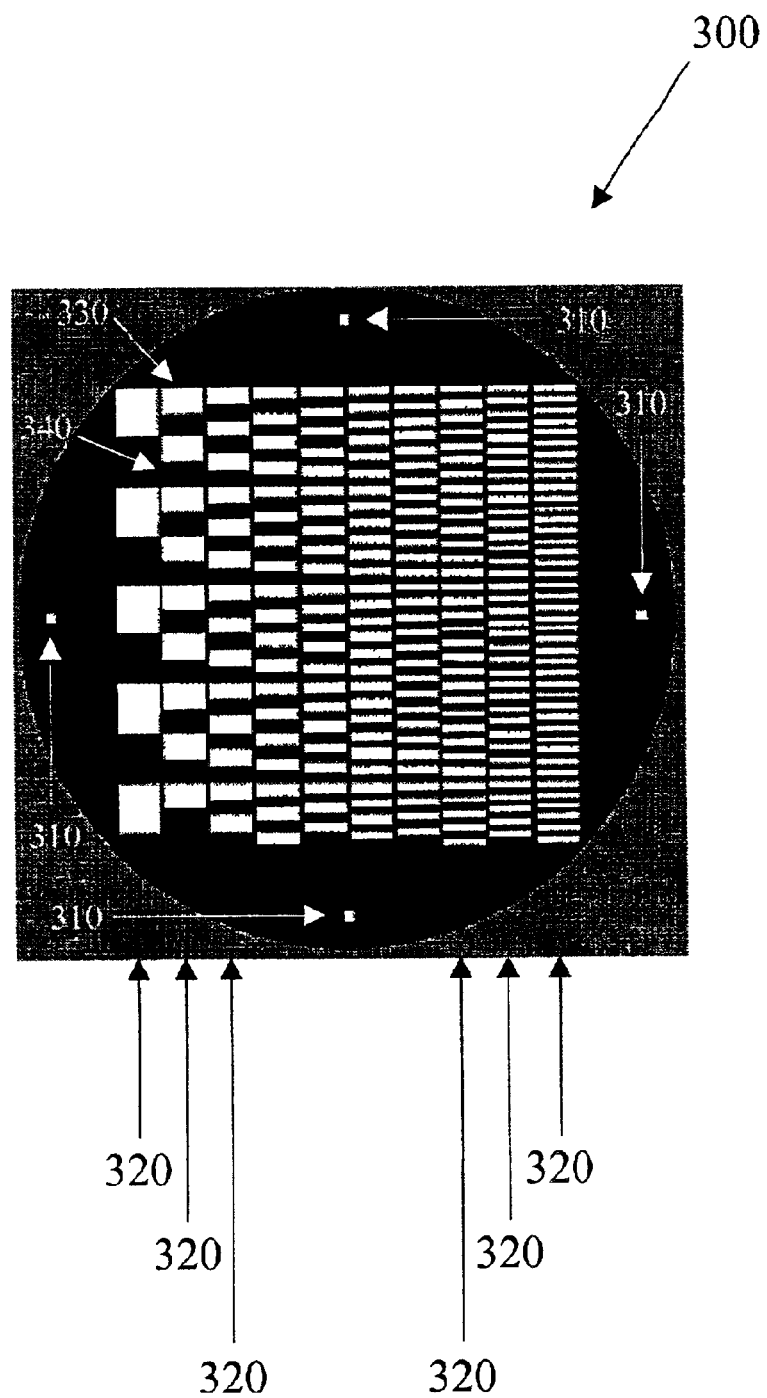
FIG. 3 is a bar target used for evaluating the MTF of the optical system in accordance with an exemplary embodiment of the present invention.

A test target can be used for determining the MTF of an optical system. The test target can be used in combination with at least one additional target, the at least one additional target comprising an open-hold DC section for determining a DC response of the optical system. According to an exemplary embodiment as shown in FIG. 3, a bar target 300 can be used for performing the MTF measurements. The test target (e.g., bar target 300) can be comprised of a medium having a pattern of opaque sections and transparent sections, in which the sections have relative sizes and spacings selected to identify plural MTFs, and a plurality of alignment holes for determining an orientation of the test target. The pattern can be a repeating bar pattern, in which each of the opaque sections can be an opaque bar and each of the transparent sections can be a transparent bar. Each of the opaque bars and the transparent bars can be in the shape of, for example, a quadrilateral. According to exemplary embodiments, each of the quadrilateral-shaped bars can be in the shape of, for example, a rectangle. The test target can be comprised of a plurality of adjacent columns of equal length, in which each column can be comprised of a repeating bar pattern. According to an exemplary embodiment, the columns can be stacked in an aligned condition having an increasing spatial frequency or a decreasing spatial frequency.

For example, bar target 300 can be comprised of a pattern of columns 320 containing alternating opaque sections 340 and transparent sections 330. The spatial frequency of the pattern and the total number of columns can be preselected in view of the desired range of the MTF test. Spatial frequency is defined as the number of alternating sections per column 320 and is generally specified in units of cycles per milliradian. The test target (e.g., bar target 300) can be comprised of any number of columns (e.g., columns 320), with the total number of columns limited only by the size of the overall target. However, at least one column (e.g., column 320) is required to be able to perform the MTF measurements using the test target (e.g., bar target 300). In an exemplary embodiment, bar target 300 has ten different spatial frequencies (i.e., ten different columns 320) with a small separation between each frequency.

The test target can be comprised of an opaque medium. In an exemplary embodiment, bar target 300 can be constructed from a flat, opaque material, such as metal or plastic. For each column 320, sections are cut out of the opaque material using a laser etching technique to create the transparent sections 330 of bar target 300. The laser etching technique uses a high-powered laser to cut through the opaque medium on which the target is to be positioned. Laser etching is described, for example, in U.S. Pat. No. 5,168,454, the disclosure of which is hereby incorporated by reference in its entirety. However, it will be appreciated by those of ordinary skill in the art that other techniques for creating bar target 300 can be used, such as that described in U.S. Pat. No. 5,509,556, the disclosure of which is hereby incorporated by reference in its entirety.

The information that can be used to generate the test target (e.g., bar target 300) includes the collimator length, the frequencies of interest (e.g., the frequency of each column 320 of bar target 300), and the size and shape of the target wheel aperture. In an exemplary embodiment, the frequencies of interest should range from near DC to approximately one and a half times the Nyquist frequency of optical system 120. However, those of ordinary skill in the art will recognize that any appropriate distribution of frequencies can be used. The final choice of frequencies is dependent upon the type of optical system 120 and the range of MTF measurements desired. Although in an exemplary embodiment the column frequency of bar target 110 should be either increasing or decreasing across bar target 300, such an arrangement of frequencies is not required. In other words, columns 320 of bar target 300 can be arranged in any order of spatial frequency.

As for the pattern of bar target 300, details of the pattern layout, section sizes, and section shapes of bar targets are disclosed in U.S. Pat. No. 4,582,427 ("the '427 patent"), the disclosure of which is hereby incorporated by reference in its entirety. The '427 patent discloses a bar target with a pattern of columns comprised of alternating opaque and transparent sections. In the '427 patent, the frequency of each column of the bar target of the '427 patent is an integral multiple of the column with the lowest frequency. In addition, the alternating opaque and transparent sections are positioned on a transparent, flat medium.

In contrast to the '427 patent, a frequency relationship between the columns of bar target 300 of the present invention is not required. In other words, the frequency of each of columns 320 is not an integral multiple of any other column—each of the columns can have a different spatial frequency than any other column. In addition, bar target 300 uses a plurality of alignment holes 310 for determining the orientation of bar target 300. According to exemplary embodiments, each of the alignment holes can be located on an opposing end of substantially-perpendicular axes, in which the axes are oriented with the test target. Thus, each of alignment holes 310 can be positioned on an opposing end of the substantially-perpendicular axes. The substantially-perpendicular axes can be oriented with the columns of bar target 300. In an exemplary embodiment, columns 320 generally form a quadrilateral-shaped object, as seen in FIG. 3. In an exemplary embodiment, alignment holes 310 can be positioned substantially perpendicular to the midpoint of each side of the quadrilateral-shaped object formed by columns 320.

Alignment holes 310 offer several advantageous characteristics. For example, the use of alignment holes provides a means by which an image of bar target 300 can be automatically rotated so that the image of bar target 300 can be aligned with predetermined axes (e.g., the columns can be parallel to the vertical axis and perpendicular to the horizontal axis). In addition, the use of alignment holes provides a simple means for determining the phase of the image of bar target 300. In contrast to the present invention, conventional methods require shifting the bar target vertically and horizontally to measure the phase. Using alignment holes 310, the image of bar target 300 can be rotated several degrees to measure the maximum modulation of each column over different phases.

Figure 5:
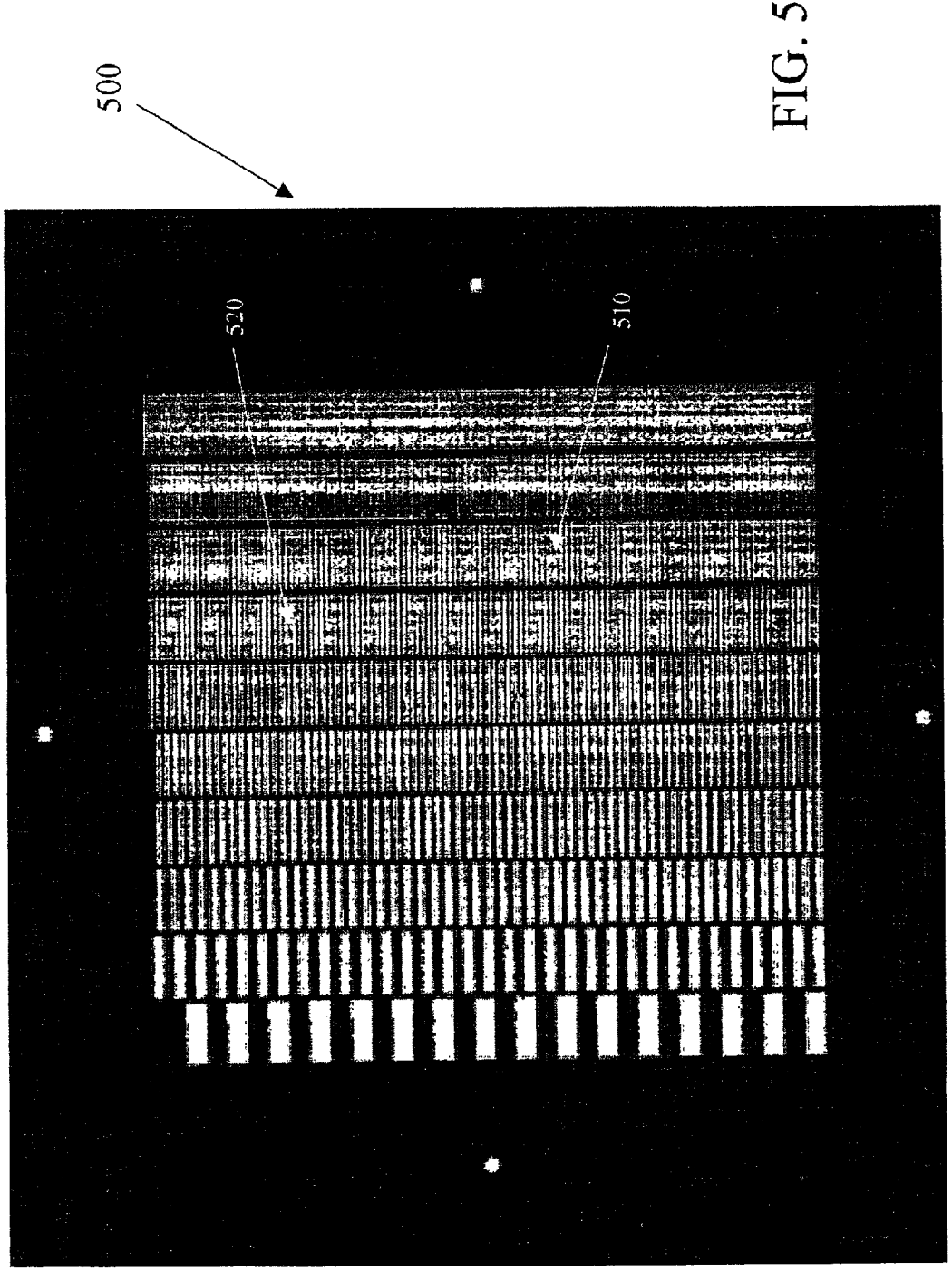
FIG. 5 is an unaligned bar target image revealing distortion.

In addition, the use of alignment holes allows for a more accurate measurement of the MTF of an optical system. A target that is not properly oriented can exhibit distortion. For example, in FIG. 5, a partially-rotated image 500 of a bar target is shown. As can be seen in FIG. 5, regions of no modulation (i.e., distortion) exist in columns 510 and 520. Since the image of bar target 300 can be rotated automatically using the alignment holes with the digital image processing techniques described herein, the orientation of bar target 110 relative to the field of view of optical system 120 is irrelevant. Consequently, the proper alignment of bar target 110 with optical system 120 before MTF measurement begins is no longer required. According to the present invention, the bar target image will be automatically rotated by image processing subsystem 140 using alignment holes 310 to properly align the bar target image for use in the MTF measurements.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for determining a modulation transfer function of an optical system, comprising the steps of:

collecting optical information from the optical system by imaging a bar target having at least one frequency to provide a bar target image for a first focus setting of the optical system;

determining a first modulation transfer function of the optical system for the at least one frequency at the first focus setting from the bar target image;

repeating the steps of collecting and determining by automatically selecting at least a second focus setting of the optical system to determine at least a second modulation transfer function for the at least one frequency; and determining a modulation transfer function for the at least one frequency of the optical system by interpolating the first and at least second modulation transfer functions.

2. The method according to claim 1, comprising the step of:

calculating a DC response of the optical system.

3. The method according to claim 2, wherein the step of calculating the DC response uses an open-hole DC target.

4. The method according to claim 1, wherein the first determining step comprises:
  locating a plurality of alignment holes in the bar target image; and
  calculating an orientation of the bar target image using the plurality of alignment holes.

5. The method according to claim 1, wherein the first determining step comprises:
  rotating the bar target image to substantially align the bar target image with a predetermined axis when the bar target image is not oriented with the predetermined axis.

6. The method according to claim 1, wherein the first determining step comprises:
  cropping the bar target image to remove a border from the bar target image.

7. The method according to claim 1, wherein the first determining step comprises:
  determining a column intensity of the bar target image.

8. The method according to claim 7, wherein the first determining step comprises:
  rotating the bar target image so that columns of the bar target image are substantially parallel with a vertical axis, when the column intensity is small.

9. The method according to claim 1, wherein the first determining step comprises:
  zooming in on the bar target image when the bar target image is too small due to a field of view of the optical system.

10. The method according to claim 1, wherein the first determining step comprises:
  cropping an outer portion of the bar target image.

11. The method according to claim 1, wherein the first determining step comprises:
  determining a noise component of modulation of the bar target image at frequencies above a Nyquist limit of the optical system.

12. The method according to claim 11, wherein the first determining step comprises:
  removing the noise component from the median contrast transfer function when the bar target image contains the noise component.

13. The method according to claim 1, comprising the step of:
  repeating the collecting and first determining steps to determine the modulation transfer function at the first and at least second focus positions at the at least one frequency for a plurality of bar target images.

14. The method according to claim 13, comprising the step of:
  determining the modulation transfer function for each of the at least one frequency by interpolating the modulation transfer function at the first and at least second focus positions for the plurality of bar target images.

15. A method for determining a modulation transfer function of an optical system, comprising the steps of:
  collecting optical information from the optical system by imaging a bar target having at least one frequency to provide a bar target image for a first focus setting of the optical system;
  determining a first modulation transfer function of the optical system for the at least one frequency at the first focus setting from the bar target image;
  repeating the steps of collecting and determining by automatically selecting at least a second focus setting of the optical system to determine at least a second modulation transfer function for the at least one frequency;
  determining a modulation transfer function for the at least one frequency of the optical system by interpolating the first and at least second modulation transfer functions; and
  determining a contrast transfer function for each of the at least one frequency within each of a plurality of regions within the bar target image.

16. The method according to claim 15, wherein the first determining step comprises:
  determining a median contrast transfer function from the contrast transfer function for each of the at least one frequency from the plurality of regions within the bar target image.

17. The method according to claim 16, wherein the first determining step comprises:
  calculating the modulation transfer function at each of the at least one frequency using the median contrast transfer function measurement and a predetermined modulation measurement function.

18. An optical system having an automated subsystem for determining a modulation transfer function of the optical system, the automated subsystem comprising:
  means for collecting optical information from the optical system by imaging a bar target having at least one frequency to provide a bar target image for a first focus setting of the optical system;
  a memory that stores steps of a computer program to:
    determine a first modulation transfer function of the optical system for the at least one frequency at the first focus setting from the bar target image,
    repeat the steps used to collect and determine by automatically selecting at least a second focus setting of the optical system to determine at least a second modulation transfer function for the at least one frequency, and
    determine a modulation transfer function for the at least one frequency of the optical system by interpolating the first and at least second modulation transfer functions; and
  a processor for accessing the memory to execute the computer program.

19. The automated subsystem according to claim 18, wherein the memory stores steps of a computer program to:
  calculate a DC response of the optical system.

20. The automated subsystem according to claim 19, wherein the step of the computer program to calculate the DC response uses an open-hole DC target.

21. The automated subsystem according to claim 18, wherein the memory stores steps of a computer program to:
  locate a plurality of alignment holes in the bar target image; and
  calculate an orientation of the bar target image using the plurality of alignment holes.

22. The automated subsystem according to claim 18, wherein the memory stores steps of a computer program to:
  rotate the bar target image to substantially align the bar target image with a predetermined axis when the bar target image is not oriented with the predetermined axis.

23. The automated subsystem according to claim 18, wherein the memory stores steps of a computer program to:
  determine a column intensity of the bar target image.

24. The automated subsystem according to claim 23, wherein the memory stores steps of a computer program to:

rotate the bar target image so that columns of the bar target image are substantially parallel with a vertical axis, when the column intensity is small.

25. The automated subsystem according to claim 18, wherein the memory stores steps of a computer program to:

repeat the steps used to collect and determine to determine the modulation transfer function at the first and at least second focus positions at the at least one frequency for a plurality of bar target images.

26. The automated subsystem according to claim 18, wherein the memory stores steps of a computer program to:

determine the modulation transfer function for each of the at least one frequency by interpolating the modulation transfer function at the first and at least second focus positions for the plurality of bar target images.

27. An optical system having an automated subsystem for determining a modulation transfer function of the optical system, the automated subsystem comprising:

means for collecting optical information from the optical system by imaging a bar target having at least one frequency to provide a bar target image for a first focus setting of the optical system;

a memory that stores steps of a computer program to:

determine a first modulation transfer function of the optical system for the at least one frequency at the first focus selling from the bar target image, repeat the steps used to collect and determine by automatically selecting at least a second focus selling of the optical system to determine at least a second modulation transfer function for the at least one frequency, determine a modulation transfer function for the at least one frequency of the optical system by interpolating the first and at least second modulation transfer functions, determine a contrast transfer function for each of the at least one frequency within each of a plurality of regions within the bar target image; and a processor for accessing the memory to execute the computer program.

28. The automated subsystem according to claim 27, wherein the memory stores steps of a computer program to:

determine a median contrast transfer function from the contrast transfer function for each of the at least one associated frequency from the plurality of regions within the bar target image.

29. The automated subsystem according to claim 28, wherein the memory stores steps of a computer program to:

calculate the modulation transfer function at each of the at least one frequency using the median contrast transfer function measurement and a predetermined modulation measurement function.

\* \* \* \* \*